US012647391B2

(12) United States Patent
Hunt et al.

(10) Patent No.: US 12,647,391 B2
(45) Date of Patent: Jun. 2, 2026

(54) ELECTRONIC COMMUNICATIONS INTERMEDIATION SERVICE

(71) Applicant: WELLS FARGO BANK, N.A., San Francisco, CA (US)

(72) Inventors: Charles L. Hunt, Saint Paul, MN (US); Doug A. Edwards, Lexington, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 68 days.

(21) Appl. No.: 18/899,170

(22) Filed: Sep. 27, 2024

(65) Prior Publication Data

US 2026/0095436 A1      Apr. 2, 2026

(51) Int. Cl.
*H04L 29/06*          (2006.01)
*H04L 9/40*           (2022.01)

(52) U.S. Cl.
CPC .......... *H04L 63/0227* (2013.01); *H04L 63/20* (2013.01)

(58) Field of Classification Search
CPC ........................... H04L 63/0227; H04L 63/20
See application file for complete search history.

(56) References Cited

U.S. PATENT DOCUMENTS 6,975,628 B2 * 12/2005 Johnson .............. H04L 63/0263
                                                        719/331
9,686,296 B1 * 6/2017 Murchison .............. H04L 63/08

9,712,557 B2 * 7/2017 Falkowitz ............. H04L 63/145
2005/0132070 A1 * 6/2005 Redlich ............... G06F 21/6209
                                                        709/228
2008/0168135 A1 * 7/2008 Redlich ................. G06F 16/282
                                                        709/204
2009/0254572 A1 * 10/2009 Redlich .................. G06Q 10/10
2010/0010968 A1 * 1/2010 Redlich ................. G06Q 10/00
                                                        707/E17.046
2010/0250497 A1 * 9/2010 Redlich .................. G06Q 10/06
                                                        707/661
2011/0161419 A1 * 6/2011 Chunilal ................ H04L 12/18
                                                        709/204
2016/0134588 A1 * 5/2016 Falkowitz ........... H04L 63/1441
                                                        726/11
2018/0278652 A1 * 9/2018 Narayanaswamy ........................
                                                        H04L 63/0281
2022/0108262 A1 * 4/2022 Cella ...................... G05B 17/02

* cited by examiner

*Primary Examiner* — Mahfuzur Rahman
(74) *Attorney, Agent, or Firm* — Kilpatrick Townsend & Stockton LLP

(57)          ABSTRACT

Systems and methods for structure electronic communications intermediation service including: receiving, from an external resource, a message; filtering the message based on a filtration protocol; identifying a first request within the message; managing a queue for the first request among a plurality of additional requests; identifying a first processing procedure of the first request; processing the first request per a first processing procedure based on an identified configuration of the first request; and transmitting the processed first request.

20 Claims, 8 Drawing Sheets

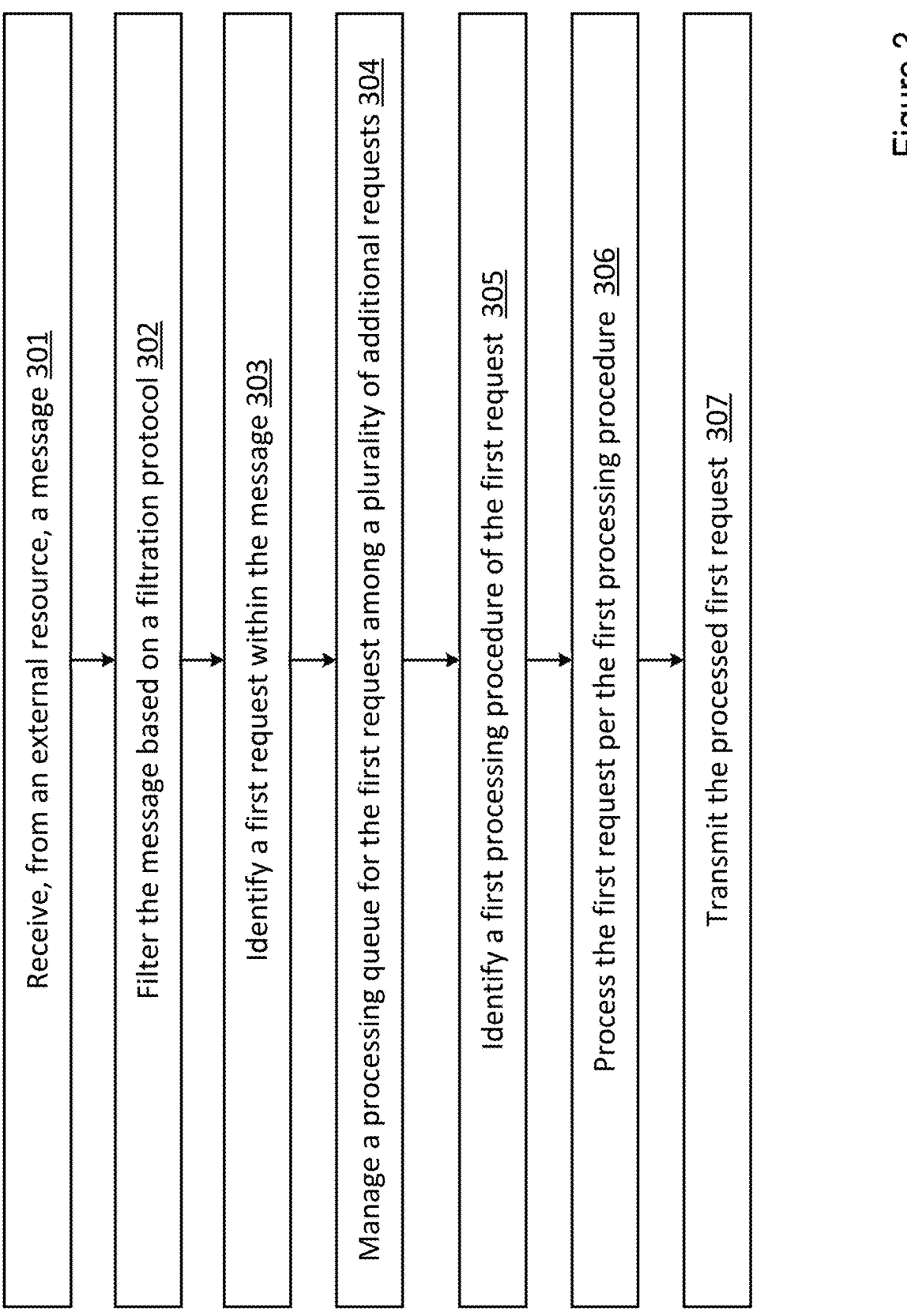

Receive, from an external resource, a message 301

Filter the message based on a filtration protocol 302

Identify a first request within the message 303

Manage a processing queue for the first request among a plurality of additional requests 304

Identify a first processing procedure of the first request 305

Process the first request per the first processing procedure 306

Transmit the processed first request 307

Figure 3

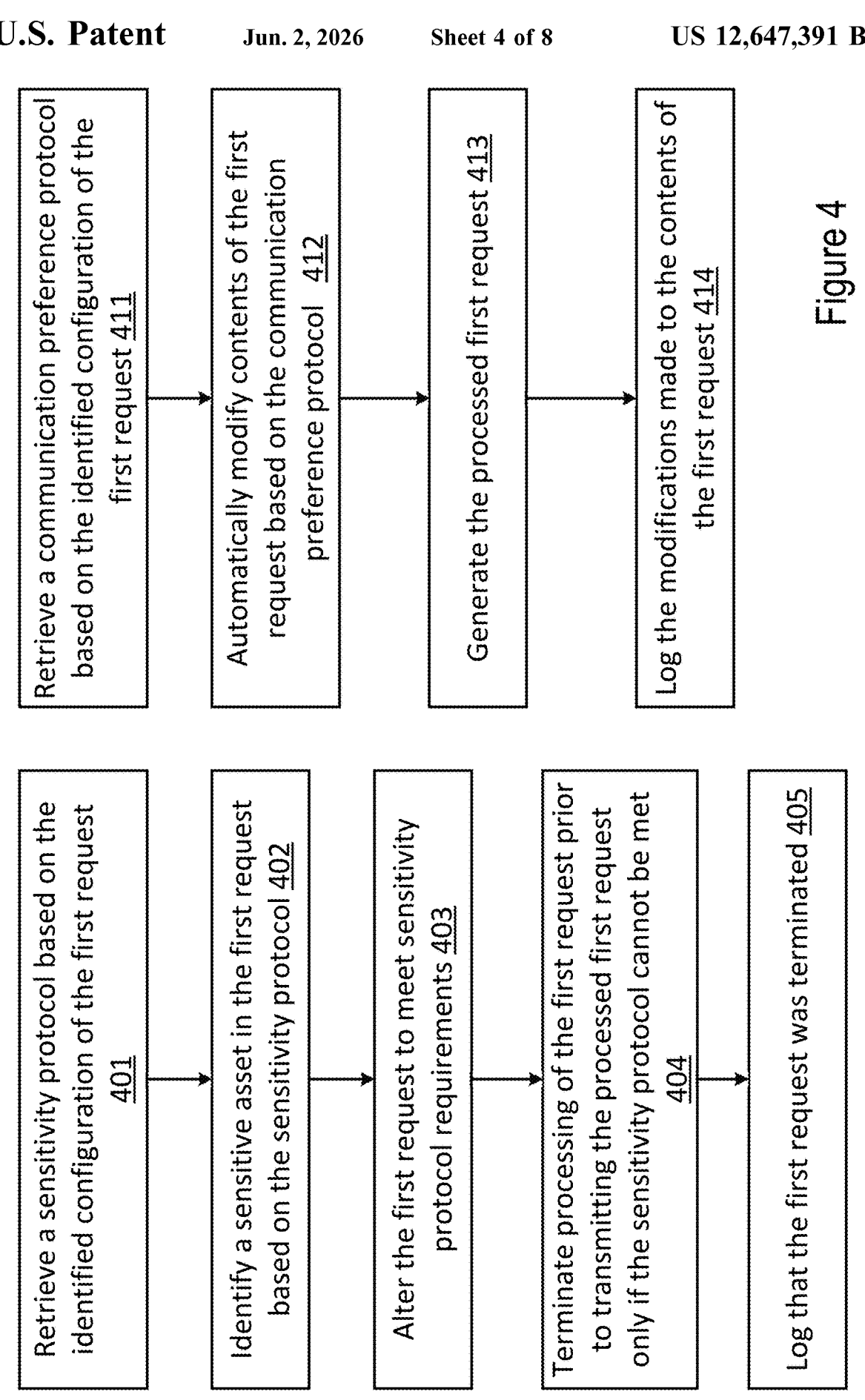

Retrieve a communication preference protocol based on the identified configuration of the first request 411

Automatically modify contents of the first request based on the communication preference protocol 412

Generate the processed first request 413

Log the modifications made to the contents of the first request 414

Retrieve a sensitivity protocol based on the identified configuration of the first request 401

Identify a sensitive asset in the first request based on the sensitivity protocol 402

Alter the first request to meet sensitivity protocol requirements 403

Terminate processing of the first request prior to transmitting the processed first request only if the sensitivity protocol cannot be met 404

Log that the first request was terminated 405

Figure 4

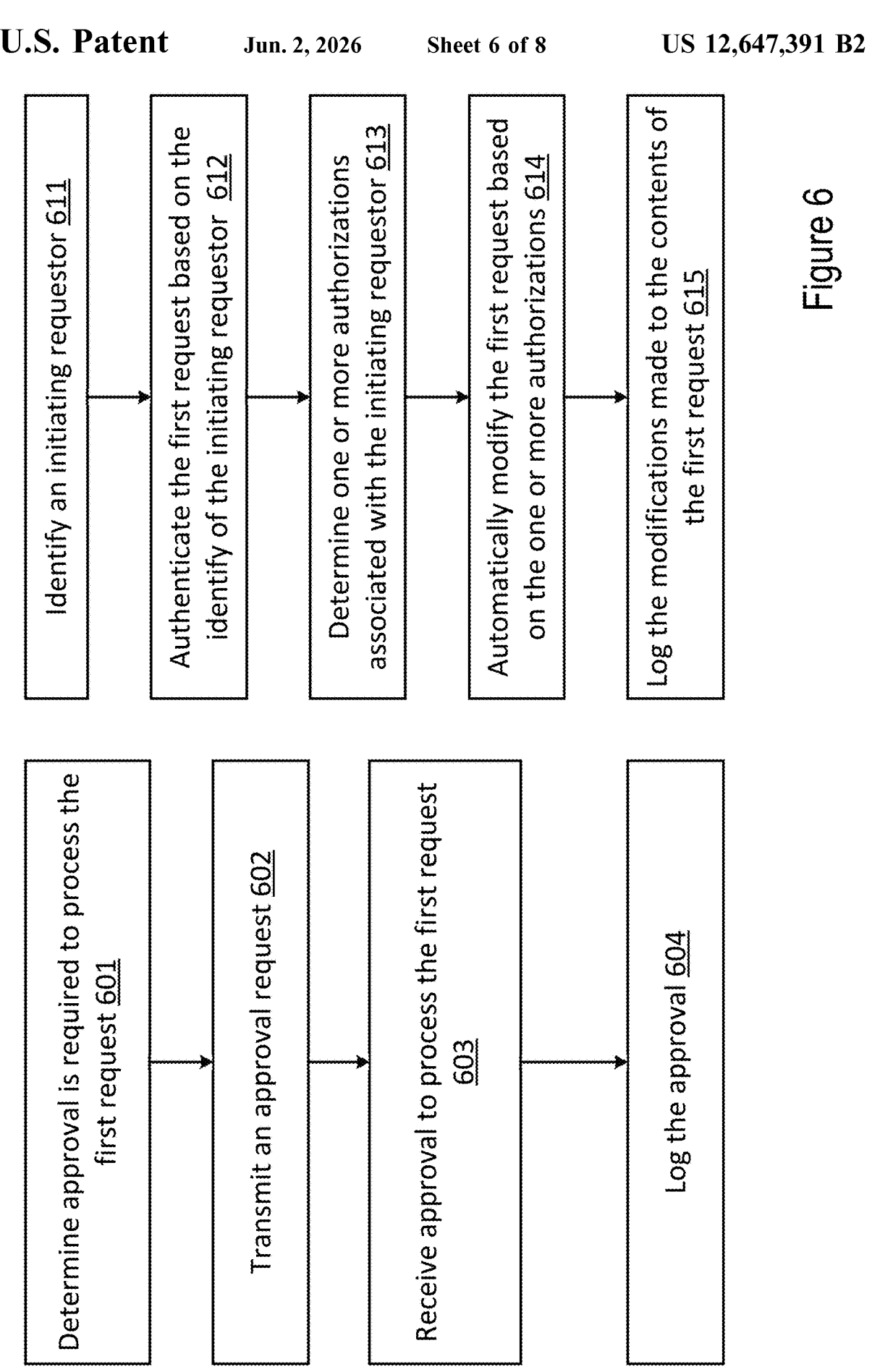

Identify an initiating requestor 611

Authenticate the first request based on the identify of the initiating requestor 612

Determine one or more authorizations associated with the initiating requestor 613

Automatically modify the first request based on the one or more authorizations 614

Log the modifications made to the contents of the first request 615

Determine approval is required to process the first request 601

Transmit an approval request 602

Receive approval to process the first request 603

Log the approval 604

Identify an essential asset of the first request 701

Validate the processed first request includes the essential asset prior to transmission of the first request 702

Transmit the processed first request 703

ELECTRONIC COMMUNICATIONS INTERMEDIATION SERVICE

FIELD OF INVENTION

The present disclosure generally relates to an electronic communications intermediation service, and more particularly to systems and methods for receiving messages containing requests from an external resource and processing the requests through an intermediation service prior to further transmission.

BACKGROUND

Shadow IT software resources, including software applications and tools created by third parties form outside an organization may present risks to the organization. Shadow IT software resources may be created by end-users or third party developers working outside the organization. Shadow IT systems may require automated interfaces with other applications managed and operated by the organization. Such software resources may be developed without complying with legal and regulatory requirements that the organization is subject to, the communication data protection, and related requirements established by the organization's policies, existing controls, or approved channels of the organization's computing network, presenting technical, management, governance, and legal challenges to the organization. Organizations need to be able to provide standard communications across a broad variety of software resources, including those developed by staff outside the information technology department or by outside third party developers, requiring integration of the organization's own software resources with those from these alternative sources. As the software resources originating external to the organization are ever increasing and diversified, the task of managing the integration of the external software resources with the organization's own trusted software resources increases in complexity.

In sensitive, highly regulated industries including finance, healthcare, and defense, issues related to managing and integrating user developed software resources and software developed by third parties exacerbated. Such regulated industries may require specific protocols in transmitting data and processing and tracking requests that are not consistently implemented or maintained in software resources developed by business users or third parties. Ensuring legal and regulatory compliance by critical infrastructure and regulated organizations is both essential but challenging for by the software resources developed by users external to the regulated organization. Regulated organizations require a reliable and secure method for interfacing and integrating the centrally managed, secure and compliant information systems with end user developed and third party developed software resources including those that are deployed outside the organization's managed environment.

SUMMARY

According to certain embodiments, an intermediation service receives a message from an external resource. The external resource may be a software tool created external and deployed outside of an organization's computing network that is configured to interface with the organization computing network. The message may contain one or more requests each request including requests for transmission of information. The intermediation service can filter the message based on a filtration protocol and manage a queue containing the request among additional requests. The intermediation service may further identify a first processing procedure of the request and process the request per the first processing procedure based on an identified configuration of the first request to generate a processed request. The intermediation system may then transmit the processed request.

Certain aspects of the present disclosure involve methods, systems and non-transitory computer-readable mediums having instructions stored thereon for executing the intermediation service.

These illustrative aspects are mentioned not to limit or define the disclosure, but to provide examples to aid understanding thereof. Additional aspects are discussed in the Detailed Description, and further description is provided there.

BRIEF DESCRIPTION

A full and enabling disclosure is set forth more particularly in the remainder of the specification. The specification makes reference to the following appended figures.

FIG. 3 illustrates a flow chart for a method of providing electronic communications intermediation according to certain aspects of this disclosure.

FIG. 4 illustrates flow charts for methods of applying protocols to received requests according to certain aspects of this disclosure.

FIG. 6 illustrates a flow chart for a method of authenticating and authorizing modifications made to requests according to certain aspects of this disclosure.

DETAILED DESCRIPTION

Figure 1:
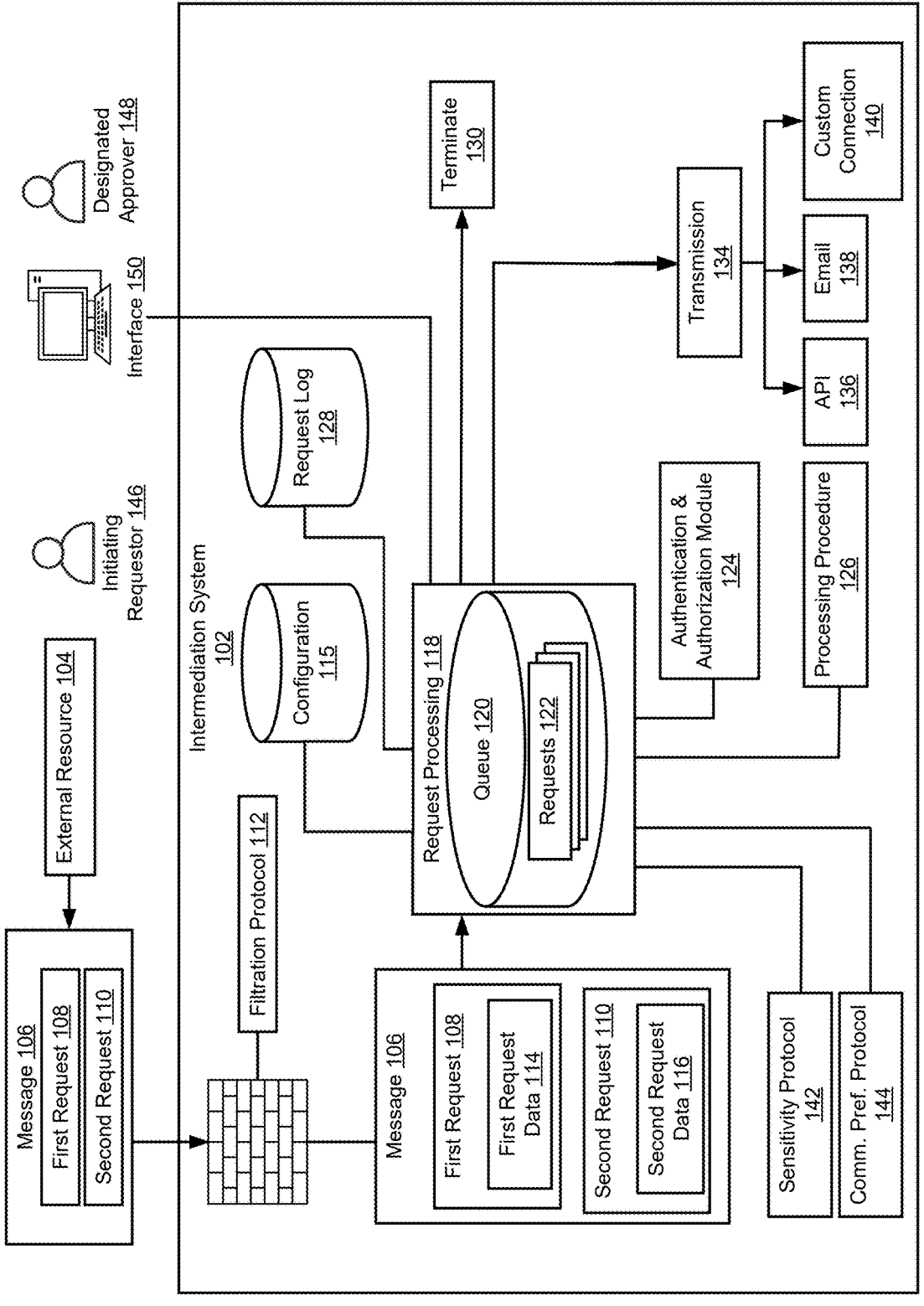
FIG. 1 illustrates a system for electronic communications intermediation according to certain aspects of this disclosure.

Reference will now be made in detail to various and alternative illustrative examples and to the accompanying drawings. Each example is provided by way of explanation, and not as a limitation. It will be apparent to those skilled in the art that modifications and variations can be made. For instance, features illustrated or described as part of one example may be used on another example to yield a still further example. Thus, it is intended that this disclosure include modifications and variations as come within the scope of the appended claims and their equivalents.

Illustrative Example of an Electronic Communications Intermediation Service

In one illustrative embodiment, a system for electronic intermediation includes an application for receiving messages initiated by external software resources. External software resources can include software tools developed by external users providing capabilities requested by the external users. Low code and no code tools such as Power Automate in addition to plug-ins, macros and other process automation tools may be identified as external software resources. External software resources may also include email generating applications, APIs, and other programs capable of generating messages and requests for transmission across an organization computing network. The external software resources may provide for an interface for end users, who may or may not be the creators of the external software resources tools, to interface with an organization computing network.

For instance, one external software resource may be in the form of an end-user billing tool providing an interface for sending billing information based on identified account number to a variety of recipient users. The billing tool may allow for end-users to transmit billing information including user's bank statements, routing numbers, or other sensitive financial information. However, per regulatory requirements, a banking organization, interfacing with the billing tool, must transmit the sensitive information received from the billing tool according to a sensitivity protocol wherein the least amount of information necessary is transmitted while other information is redacted. The billing tool, while providing a general structure for transmitting the billing information and account number, may not be in compliance with the sensitivity protocol. In other examples, the external software resource tool provides an interface for sending other information requiring additional formatting to comply with a sensitivity protocol, such as an interface for sending health information, security information, or other sensitive information.

The electronic intermediation system is capable of receiving messages initiated by one or more external software resources, each message containing one or more requests. The electronic intermediation system may be tailored to a specific industry, e.g., banking, wherein the electronic intermediation system communicates with various systems and databases using the organization's computing network. Request processing and transmission protocols handled internal to the banking organization may already be compliant with regulatory requirements addressing the secure processing and transmission of sensitive information. The electronic intermediation system may then provide a means for receiving messages including one or more requests originating outside the organization, generated by external software resources, and processing and filtering those requests to ensure compliance with the protocols established internal to the organization computing network.

Environments implementing sensitivity protocols, such as banking or healthcare industries, may also require systematic logging and tracking of requests being processed. The electronic intermediation according to some examples, is capable of tracking each action performed by the electronic intermediation system in processing requests. In the banking example, the electronic intermediation system receives a message including requests for financial statements and information requiring partial redaction prior to further transmission. The electronic intermediation system may log when the message was received, from whom the message was received, and additional log data related to the message. The electronic intermediation system may then process the message per a sensitivity protocol, e.g., return only redacted sensitive information such as returning only the last 4 characters of financial account numbers to provide consistent protections for customer information, or may reject requests that the initiating requestor is not authorized to make. Execution of sensitivity protocols may additionally be logged to demonstrate compliance with legal requirements. Requests that are rejected may be further logged in a request log and follow-up cases created where required. Additional acts by users operating within the electronic intermediation system may also be recorded and logged.

The electronic intermediation system may provide a user interface to allow designated approvers, such as case investigators, or other operators of the electronic intermediation system to proceed with processing, follow-up on exceptions and other cases, and provide necessary support and problem resolution. For instance, a designated approver managing a banking organization may access an interface of the electronic intermediation system to review the requests that require their approval, record their decision to allow the request to continue processing or be terminated. Alternatively, a support analyst may also review each action performed on a request to perform a variety of tasks such as troubleshooting unprocessed requests, or to establish regulatory compliance with request processing.

Example System for Electronic Communications Intermediation

FIG. 1 illustrates a system for electronic communications intermediation according to certain aspects of this disclosure. The system 100 further includes an intermediation system 102 capable of receiving a message 106 including requests from an external resource 104. The intermediation system 102 includes filtration protocol 112 for filtering messages 106 received by external resource 104. Once received, the messages 106 are identified as storing one or more requests which are then processed by a request processing module 118 (also referred to as request processing). The request processing module 118 is capable of performing various operations on requests prior to transmission 134 of the requests or terminating 130 the requests prior to transmission 134. Each act performed by the request processing module 118 may be stored in a request log 128.

The intermediation system 102 may receive messages 106 from external resource 104. The external resource 104 uses software tools not native to the intermediation system 102. Such external resources 104 may be developed and deployed by personnel who are within the organization using a variety of low code/no code, or other development tools. External resources 104 may additionally use external software tools developed by third parties. These external software tools may be deployed inside or outside the organization's computer network. The external resource 104 for instance may be a low-code or no code tool developed by an end user seeking to initiate requests to be performed by the organization to which the intermediation system 102 belongs. Examples of external resources 104 include PowerAutomate, macros and other process automation tools capable of generating messages 106 specified by the intermediation system 102. An initiating requestor 146 may use the external resource 104 to generate messages for reception by the intermediation system 102. The external resource 104 provides an interface for an initiating requestor 146 to generate a message 106 including requests for processing by the intermediation system 102. The initiating requestor 146 may be a human or non-human (e.g. automated) provider of messages 106 to the intermediation system 102.

Messages 106 are made up of one or more requests of formats defined by the intermediation system including request data 114 and provided by external resource 104. The methods used to provide the data in the request are external to the intermediation system but may be entered by a human actor (e.g., initiating requestor 146), or external process. Messages may contain one or more requests such as a first request 108 and a second request 110. A message 106 containing only a first request 108 may include the a request to perform a single action, e.g., send an email or access data via an API. It should be noted that even these single step requests may require the intermediation system 102 to carry out a series of processing steps (As discussed further with respect to FIGS. 3-7). Messages 106 may also contain multiple conditional actions, with options identified in specified sections of the request. For example, a conditional message may include a first set of data to execute a parameterized query, and a second set of data would invoke an option to send a notification to a specified list of email addresses if there were results that exceeded a record count or if any results exceeded a specified value. The second set of data could include instructions to deliver the results to a required primary destination and/or to send copies of the results to an optional set of specified destinations using approved methods. Request processing 118 can therefore be seen as a structured interaction between the request data provided in the request 108 and the configuration on record for that request type (e.g., the configuration 115 of the first request 108). Each request in a message 106 is treated separately by the intermediation system 102 and the ability to optionally include multiple requests in one message 106 is intended to allow external resources 104 to communicate more reliably with the intermediation system 102. Data associated with the configuration 115 of a given request is discussed with respect to the example of FIG. 2.

Messages 106 received by the intermediation system 102 may be initially processed and filtered per a filtration protocol 112. Filtration protocol 112 may include a procedure for rejecting non-compliant messages 106 or request 108 110 or messages and requests identified as containing malware and other risks to the organization computing environment. In one example, filtration protocol 112 analyzes the requests in each message 106 for compliant formatting according to a list of preapproved requests. If the message 106 and the requests contained within the message 106 contain improper formatting, or do not align with a given request format recognized by the filtration protocol 112 may reject the message 106 prior to additional processing the intermediation system 102 may then log and optionally, notify support personnel or the organization's cyber-security personnel that the message 106 was rejected, and the reason for rejecting the message 106.

Requests received by the intermediation system 102 and filtered by the filtration protocol 112 may be sent to a request processing module 118 which provides further processing of the request prior to transmission 134. The request processing module 118 receives requests that have been filtered in the filtration protocol 112. The request processing module 118 may check the message type and retrieve the configuration 115 of steps called for that request type. Each of these steps are added to the queue 120 (also referred to as the processing queue). Since each request may include one to many steps including required and optional steps, the establishment and maintenance of the queue 120 may provide for the correct functioning of the intermediation system 102. The request data 114, 116 for each request type is used to establish the initial processing queue 120 and includes additional parameters required for processing. The processing procedures identified within the request may result in a defined set of compliant results which may, in some instances include transmission of data, and in other instances, preventing data from being transmitted, such as noncompliant data and malware. Successful processing of a given request type may result in updates to one or more systems, and//or notifications to specific personnel, such as designated approvers 148 discussed further below.

Request data 114, 116 can include user profile data. User profile data includes information about each initiating requestor 146 initiating a given request necessary for processing. For instance, the user profile data can include the address of the initiating requestor 146 for providing confirmation of successful processing of the request. The user profile data also holds authentication and authorization data necessary for the authentication and authorization module 124 to process the request.

Request data 114, 116 can include organization data. organization data includes information about the organization to which the intermediation system 102 processes the request on behalf of. Organization data includes lists of designated approvers 148 of a given request, escalation points, delegates, and other information linking processing of the request to the organization which subsequently may process the request or receive the processed request. For instance, designated approvers 148 may include case owners which refer to organization users tasked with reviewing and approving requests, in addition to requests logs from the request log database 128. Case owners may be identified based on responsibilities defined in the organization data. Designated approvers 148 may also include action owners similarly tasked with reviewing and approving requests in addition to request logs. Action owners may be identified based on the user and/or source of the request.

Request data 114, 116 can include log data. Log data indicates that each action performed on a given request (e.g., request 202) may be logged. Log data may be stored as appended metadata to the request or may be stored in another database such as a request log 128. Log data may include the time and date of a given request, flags for optional or required follow-up, and information about the events being logged.

Required steps are steps which are always added to the queue 120 for a request. Optional steps in the configuration may be of two subtypes. For example, certain requests, e.g., to send an email with no sensitive assets, may not require authentication, while others e.g., sending account and routing numbers, may require authentication prior to further processing. While the queue 120 is being established, processing options invoked by the initiating requestor 146 in the request are added to the queue 120. For example, the initiating requestor 146 may choose to invoke an option allowed for a specific message type to be notified when the request completes processing. When invoked in the request 108 and/or request 110 these optional steps are added to the queue 120. The second type of optional step is determined during processing and contingent on results of that processing. The queue 120 may be added to, updated, and have requests closed while logs are generated according to various procedures discussed with respect to FIG. 5. For example, the request processing module 118 might add various notification steps (including information about the results) to the queue 120 for the request if there were any transactions that exceeded a specified dollar limit such as $1,000,000. The request processing module 118 may execute various steps for each request in the queue 120. The FIGS. 3-7 provide examples of possible series of steps to explain the balance of FIG. 1

Having established the queue for the first request 108 and/or second request 110, the request processing module

118 may call the authentication and authorization module 124 to authenticate the initiating requestor 146 or the external resource 104 to verify the identity of the person or process that initiated the requests 108 or 110. If the authentication can be completed with information included in the request, the authentication and authorization module 124 will attempt to verify if the initiating requestor 146 or external resource 104 is authorized to make the request. If both steps are successful, the module will return information to request processing 118 to allow processing to continue. Authentication protocols such as multi-factor authentication, user ID and password, and other techniques may be applied to authenticate the initiating requestor 146. Failed authentications may be logged in request log 128.

The configuration 115 for some request types may require the initiating requestor 146 to authenticate interactively. The request processing module 118 might notify the initiating requestor 146 via an email prompting them to use the interface 150 to log in and select one or more requests they initiated. The interface 150 will then return information to the request processing module 118 which may then make an alternative request to verify authorization to the authentication and authorization module 124 which will return the results to the request processing module 118 to allow processing to continue.

The configuration 115 for some request types may include provisions that may set a maximum number of days for the initiating requestor 146 to authenticate requests using the interface 150. If the initiating requestor 146 does not respond within the required period, the request processing module 118 will call the terminate module 130 to close out the request.

The request processing module 118 may maintain the status of processing in the queue 120 and record the progress in the request log 128. Maintaining the status of processing in the queue 120 and recording the progress in the request log 128 may be carried out throughout the operation of the request processing module 118. The request log 128 may be used for troubleshooting, investigation of cases (as in the follow-up cases 220 of FIG. 2), and to demonstrate compliance with applicable policies, laws, and regulations.

The configuration 115 for some request types may require separate approval to comply with laws, regulations, or an organization's policies. In such an eventuality, the request processing module 118, will notify the designated approver 148 via email. The designated approver 148 will use the interface 150 to view a list of all the pending approvals waiting for their approval. The designated approver 148 can indicate their decision in the interface 150. The interface 150 will then return the results to the request processing module 118. Based on the response, the request processing module 118 will update the queue 120 and request log 128. If the designated approver 148 approved the request, processing will continue. If the designated approver 148 rejects the request, the request processing module 118 will call the terminate module 130 to close out the request. The configuration 115 for the request type may also include a maximum number of days for response. When specified, the request processing module 118 will proceed as described above.

The request processing module 118 may encounter steps in the queue that require a variety of automated processes including but not limited to connecting to one or more databases, retrieving data from those databases, making updates, other procedural processes, etc. which may be carried out by processing procedure 126. Some instances of processing procedure 126 are specific to a particular request type others, especially those that perform standardized functions, might be shared between multiple request types.

Some request types may deal with data that is particularly sensitive. For example, banks by the nature of their business deal with sensitive financial and tax information about customers that may require consistent safeguards to comply with policy, laws, or regulations in various jurisdictions. to address this one or more instances of sensitivity protocol 142 may be used. For request types that deal with sensitive data, the request processing module 118 may call one or more sensitivity protocols 142. The sensitivity protocol 142 will analyze the data and ensure that the data returned conforms to the organization's requirements. In the banking example, the sensitivity protocol 142 may include instructions to identify a given request, originating from external the intermediation system 102 by the external resource 104, as sufficiently similar to the format of a banking compliant request. The sensitivity protocol 142 may then modify the contents of the request by removing sensitive assets within the request such as the requestor's account number or address. In other examples, the sensitivity protocol 142 may reject the request entirely and terminate 130 processing of the request prior to transmission 134. In the same or other examples, the intermediation system 102 then logs the operations performed by the sensitivity protocol 142. The use of sensitivity protocol 142 to consistently meet the policy, legal, and regulatory requirements also allows the organization to react quickly and consistently to internally or externally mandated changes.

Instances of communications preference protocol 144 may similarly be called by the request processing module 118 to assemble one or more deliverables called for by the request type of a given request which may be necessary at various points in the processing of the request. Communications preference protocol 144 may include instructions to analyze the content and apply the correct formatting rules to modify or otherwise ensure what is returned to the request processing module 118 is compliant. For example, the communications protocol 144 may modify a request to send an email by replacing the brand logo template within the request to a newer version to ensure brand compliance. The communications preference protocol 144 may also include contact rules to ensure that emails, files and the like are sent only to internal recipients or to specific authorized contacts, e.g. customers, or conform to customer preferences. Contact rules may also include a blacklist of contacts who are not able to send or receive specific messages.

Depending on the configuration of the request and the procedures applied to the request, processing of the request may be terminated 130. Alternatively based on the compliant and redacted results returned from the sensitivity protocol 142 when the request includes sensitive assets and communications preference protocol 144 with compliant branding, recipients and communication methods the request processing module 118 may call an instance of transmission 134 to return one or more results of the request. Examples of transmission 134 include sending the processed request through an API 136, an email 138, and/or a custom connection 140. Such examples of transmission 134 are nonlimiting and other examples may be provided including saving the processed request to a shared file, or other means of displaying to a user the results of the processed request.

As mentioned, the intermediation system 102 includes a request log 128 capable of storing logs of each request. The logs may include each action performed on the request including the processing of the request, the transmission 134 of the results developed during the processing of the request or the termination 130 of the request.

In some examples, components of the intermediation system 102 may be stored across one or more devices. For instance, the request log 128 may operate on a cloud service provider infrastructure separate from other components such as the request processing module 118 or the processing procedure module 126.

Example Configuration of a Request

Figure 2:
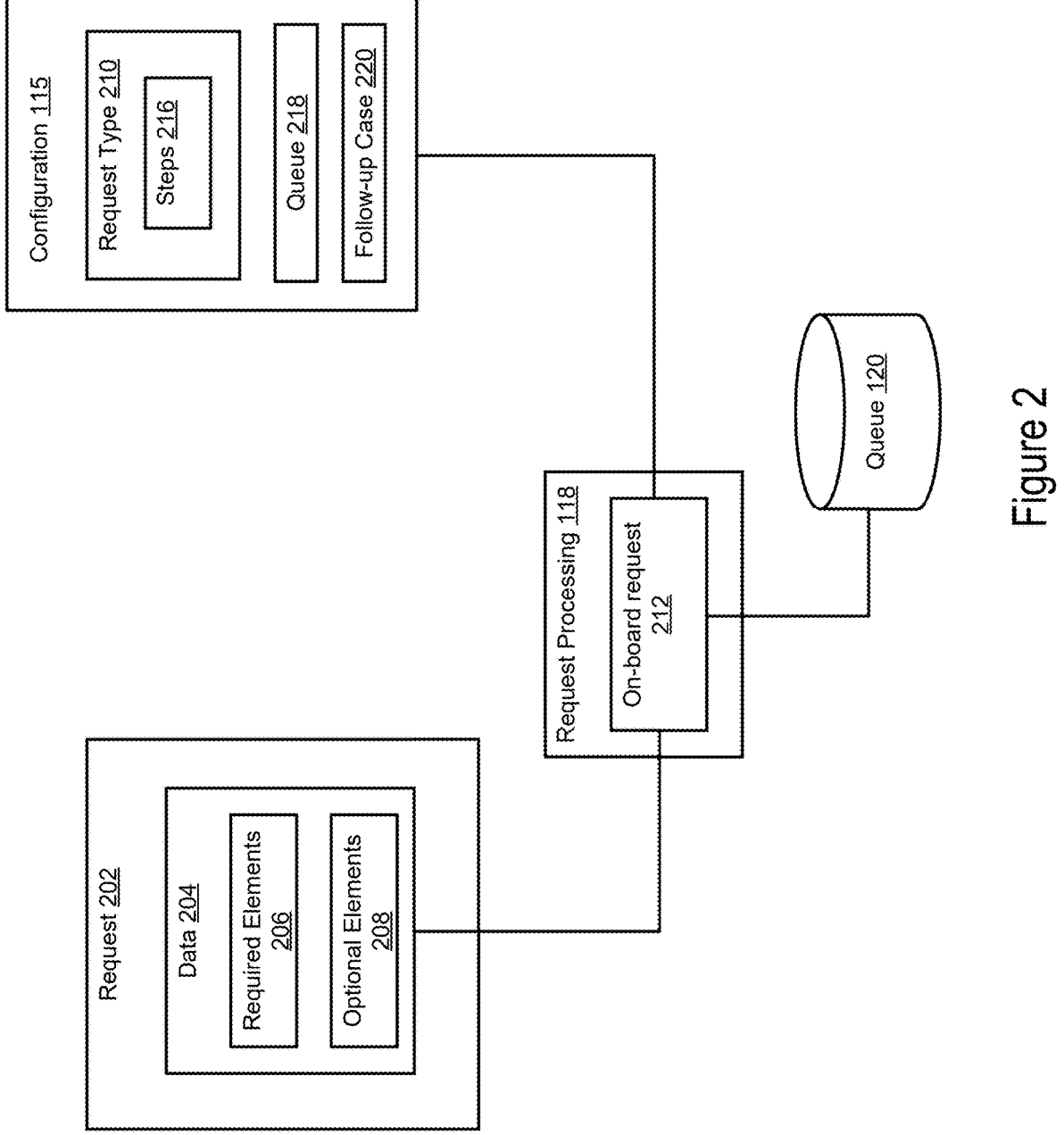
FIG. 2 illustrates an example of configuration data associated with a request according to certain aspects of this disclosure.

FIG. 2 illustrates an example of request and configuration data associated with a request according to certain aspects of this disclosure. Request 202 is representative of the requests discussed with respect to FIG. 1 and may include the first request 108, second request 110, and/or one or more of the plurality of additional requests 122. Request 202 includes data 204 such as required elements 206 and optional elements 208 specified for a specific request type 210. Data 204 is understood to include the parameters necessary to allow request processing 118 to onboard 212 the request to the queue 120 as specified in configuration 115 which includes required and optional steps 216.

Organizational data 214 (e.g. to determine who is allowed to approve requests when required) provides additional information for the execution of each request 202 when onboarded 212 and as per the discussion of FIG. 1, additional optional steps governed by the intermediate results of execution. In an example, organizational data 214 can include optional steps include directing request processing 118 to open a follow-up case 220 if user authorization fails for the onboarded request 212.

The configuration 115 of the request 202 is shown including queue data 218. Queue data 218 may be used to store the current status of the request 202 including whether the request is pending, completed, or other status information including whether the request 202 is to be completed prior or subsequent to another request. Queue data 218 may be consolidated among each request to generate or modify queue 120 within the request processing module 118.

The configuration 115 of the request 202 is shown including follow-up case data 220. Follow-up case data 220 captures events in each request or requests themselves which require follow-up. Follow-up cases 220 will initiate investigations by authorized personnel such as designated approvers 148 to determine the root cause of the event that satisfy trigger conditions. Investigators, such as designated approvers 148 may then record their findings and actions taken to address the situation that triggered the creation of the follow-up cases 220.

Example Method for Electronic Communications Intermediation

FIG. 3 illustrates a flow chart for a method of providing electronic communications intermediation according to certain aspects of this disclosure. The flow chart 300 illustrates how the electronic intermediation system may receive a message from an external resource and process a request according to aspects of the disclosure. Other examples may include more operations, fewer operations, different operations, or a different order of the operations shown in FIG. 3.

At step 301, request processing 118 receives a message 106 from an external resource 104. The message 106 may include one or more requests such as a first request 108 and a second request 110, though any number of requests may be contained within a given message 106. The requests may include required elements 206 and optional e elements 208 as specified by the request type 210. The intermediation system 102 may be configured to identify each request within the message, separate them to enable a processing queue 120 to be created for the request as described below The message 106 may be generated by an end user requestor using the external resource 104 for transmission through an organization network. Prior to transmission by the organization network, the intermediation system 102, operating as a gatekeeper for the organization network, receives the message for processing.

At step 302, request processing 118 filters the message based on a filtration protocol 112. The filtration protocol 112 may include a procedure for rejecting non-compliant messages 106 or messages identified as containing malware and other risks to the organization computing network. Non-compliant messages may include messages containing requests that are not able to be processed due to lacking necessary information based on the required and optional parameters specified by request type 210. The filtration protocol 112 may be configured by a designated approver 148, organization administrator or another user with privileged access to the intermediation system 102.

At step 303, request processing 118 identifies a first request 108 within the message. Each request discussed, including first request 108 includes a request to perform an action by human or automated initiating requestor 146. For instance, one request may be in the form of an email notification to be sent to a list of email recipients for transmission across organization computing network. Another example of a request includes requesting access to information from a privileged database within the organization computing network, such as a user's social security number or financial statements. Requests may be sent per any format capable of standardization, including email files, JSON files, XML files, or fixed length files. As discussed above, the request can be preprocessed into a series of defined required and optional steps that are used to create the entries for the request in the queue which is then processed in a processing queue 120 for the first request among a plurality of additional requests.

At step 304, request processing 118 manages a queue 120 for the first request 108 among a plurality of additional requests 122. The plurality of additional requests 122 may include additional requests contained within the same message 106 as the first request 108, e.g. the second request 110. Managing the queue 120 may include, upon a first instance, creating the queue 120 for the first request 108. On additional instances, managing the queue 120 may include adding, updating, and closing requests within the queue 120, including queuing requests flagged as having follow-up case data 220. A request's placement on the queue 120 may be set using one or more priority rules. The priority rules may for instance be based on the first request 108 data 114.

At step 305, the request processing 118 identifies a first processing procedure of the first request. The queue of the first request includes data instructing request processing 118 what processing procedures to apply to the first request. For instance, the first processing procedure of the first request 108 may indicate that an email to a list of customers to be created in the communications preference protocol 144 and the list validated against customer preference data to ensure that customer opt in and opt out decisions are honored to comply with regulations, then format the email(s) to current brand standards and if any customers are removed from the list due to opt in or opt out violations prepare this data and return the full package to request processing 118. When request processing receives the response request processing 118 can initiate a follow-up case 220 for the identified violations, log the actions taken and status, and identify the next step in processing the request.

At step 306, the intermediation system 102 processes the first request 108 per a processing procedure 126. The processing procedure 126 may be chosen based on the identified configuration 115 of the first request 108. For instance, the first request configuration 115 may indicate that the first request 108 includes one or more sensitive assets triggering a sensitivity protocol 142 to be applied to the first request 108. Additionally, or alternatively, the first request configuration 115 may include customer preference data indicating a specific communication preference protocol 144 is to be applied to standardize the first request 108.

At step 307, the intermediation system 102 transmits the processed first request 108. The intermediation system 102, depending on the first request configuration and how the first request was processed, may transmit the processed first request back to the initiating requestor 146, or to another user across an organization computing network. Transmitting the first request may include sending notifications, status, and data to the initiating requestor 146. Transmission may also include sending notifications, status, and data to other users such as the recipients identified in the first request 108 data 114. Status updates and data intended for system delivery may be made using APIs 136 Custom connections 140 may also be used in transmitting the first request 108. Multiple methods of transmission, e.g., by APIs 136, emails 138, or custom connections may be applied as defined by the first request 108 configuration 115.

Example Methods for Processing Requests

FIG. 4 illustrates flow charts for methods of applying protocols to received requests according to certain aspects of this disclosure. Each method 400, 410 illustrates methods by which the intermediation system 102 may process a request to generate a processed request.

At step 401, request processing 118, through request processing 118, retrieves a sensitivity protocol 142 based on the queue of the first request 108. Sensitivity protocols 142 include sent data that may be checked and, when necessary, processed for compliance. For instance, a sensitivity protocol 142 related to an email request may include analyzing the intended recipients including the To: addressees as well as the BCC: addressees and comparing the addressees against the type of data in the email and the types of data that each recipient is authorized to receive, (e.g., identifying sensitive assets as in step 402). In another example, a first request 108 may be initiated to retrieve specified information from an organization computing network, such as customer's or a group of customers' financial status. In response, as discussed with respect to steps 402 and 403, the sensitivity protocol 142 identifies a specific sensitive data and may redact (i.e., remove), or mask (i.e., removing or otherwise masking portions of the data to preserve the data's utility, but reduce its sensitivity to an acceptable level.

In an example of an email sensitivity protocol, request processing 118 will pass the email data to the sensitivity protocol 142. Then, in step 402 sensitivity protocol 142 may determine that sensitive assets are included within the content of the email, or that one or more of the intended recipient is unverified. In response, the sensitivity protocol 142 may remove the unverified recipients. If attempts to remove the unverified recipients results in an email with no recipients, the sensitivity protocol 142 will notify request processing 118 that it was unable to create a compliant email so that request processing 118 can terminate the request as described above. Additionally the sensitivity protocol will summarize the actions taken and request processing 118 may create a follow-up case 220 in response to the identified issues. the sensitivity protocol will return results to request processing 118 for subsequent processing as directed by the configuration of the request type 210.

At step 402, the intermediation system 102 identifies a sensitive asset in the first request 108 based on the sensitivity protocol 142. Sensitive assets may include the information, that per regulatory, customer, or other requirements, can only be transmitted securely and to specified subsets of users. After retrieving a specified sensitivity protocol 142, the intermediation system 102 can filter out the first request 108 to identify each sensitive asset in the first request 108.

At step 403, request processing 118 alters the first request to meet sensitivity protocol requirements. Following step 402, the first request, is known to include one or more sensitive assets. For instance, optional elements 208 that are determined to violate the sensitivity protocol, e.g., text identifying PII of a given user which is unauthorized, may be removed. Alternatively, the intermediation system 102 may mask or obscure any optional elements which would otherwise violate a sensitivity protocol. The intermediation system may also 102 modify required elements 206 within permissible bounds to remove or mask non-compliant, sensitive data from required elements of the request. In some examples, request processing 118 can successfully alter the first request to bring it into compliance with regulatory policies, customer policies, or other requirements and return the updated file to request processing 118 for subsequent processing. However, in other instances, request processing 118 may be unable to alter the first request to meet the sensitivity protocol requirements (e.g., removing all email recipients violating the sensitivity protocol would result in no recipients), in such cases the method 400 proceeds to step 404 where request processing 118 may terminate processing of the first request prior to transmitting the processed first request when the sensitivity protocol cannot be met.

At step 404, the intermediation system 102 terminates processing of the first request 108 prior to transmitting the processed first request 108 when the sensitivity protocol cannot be met. In response to determining that the first request 108 includes a request to transmit a sensitive asset at step 402, and attempting to modify the processed first request per step 403, the intermediation system 102 may determine that the request cannot be modified to be made complaint, the intermediation system 102 may reject further processing of the first request 108 and terminate 130 processing. The intermediation system may generate a follow-up notification (e.g. an alert) to the initiating requestor 146, or to another user, that the first request 108 was not permitted due to the applied sensitivity protocol identifying the request as containing a sensitive asset that cannot be made compliant. In the follow-up notification, the intermediation system 102 may further indicate to the initiating requestor 146 or designated approver 148 means of initiating or processing a similar request without rejecting processing of the first request. For instance, the intermediation system 102 may indicate to the initiating requestor 146 that by removing specific recipients from an email request, a different sensitivity protocol would be applied wherein the content of the request would not be rejected as a sensitive asset. In other examples, the intermediation system 102 may automatically modify a non-compliant request, e.g. by removing sensitive assets from the request, or by removing unapproved recipients from the request to generate a processed request 132 for transmission.

At step 405, request processing 118 logs that the first request 108 was terminated. The log may be stored in the request log 128 for future retrieval by an organization administrator. In other examples, where noncompliant requests are automatically processed to be compliant prior to transmission, e.g. by removing sensitive assets from the request to generate the processed request, the intermediation system 102 may further log each modification made to generate the processed request in the request log 128.

Method 410 describes processing performed by the intermediation system 102 similar to method 400, but from the perspective where client and customer preferences and requirements motivate the processing of a given request. At step 411, the intermediation system 102 retrieves a communication preference protocol based on the identified configuration of the first request. The intermediation system 102 may retrieve the communication preference protocol 144 based on the identity of the initiating requestor 146, the identity of any listed recipient, or based on other data associated with the request such as customer preference data and user profile data.

At step 412, request processing 118 automatically modifies contents of the first request 108 based on the communication preference protocol 144. As an example, the communication preference protocol 144 may forbid transmission of certain filetypes or may forbid transmission to classes of recipients such as unverified recipients. In response to identifying forbidden contents in the request, the intermediation system 102 may automatically remove the forbidden contents from the request to generate the processed request for transmission 134. The intermediation system 102 may generate a follow-up notification sent back to the requestor or other user indicating the modification made. In other examples, in response to determining that a request is noncompliant with the identified communication preference protocol 144, the intermediation system 102 may terminate 130 further processing of the request prior to transmission 134 of the request.

At step 413, request processing 118 generates the processed first request. The processed first request first may be similar or identical the first request 108 depending on the communication preference protocol 144 applied and the content of the first request 108. Compliant, processed first requests may for instance may be identical to the first request 108. Processed first requests based on first requests noncompliant with the identified communication preference protocol 144 may be similar, but with target assets removed or modified, e.g., the specific recipient users being removed from the list for transmission 134. In other examples, based on the communication preference protocol 144, the intermediation system 102 may reject processing of the request and terminate further processing and transmission of the first request 108. In such examples, the intermediation system 102 may generate a follow-up notification to the requestor indicating that the first request 108 was not transmitted and the reasons why, e.g. the first request 108 not being compliant with the identified with the communications preference protocol 144.

At step 414, request processing 118 logs the modifications made to the contents of the first request 108. The log may be stored in the request log 128 for future retrieval by an organization administrator. The log may store information related to each modification made to the first request 108 in generating the processed first request 108, e.g. what information was removed from the first request 108 or which target recipients were removed from the first request 108.

Example Methods for Managing a Request Queue

Figure 5:
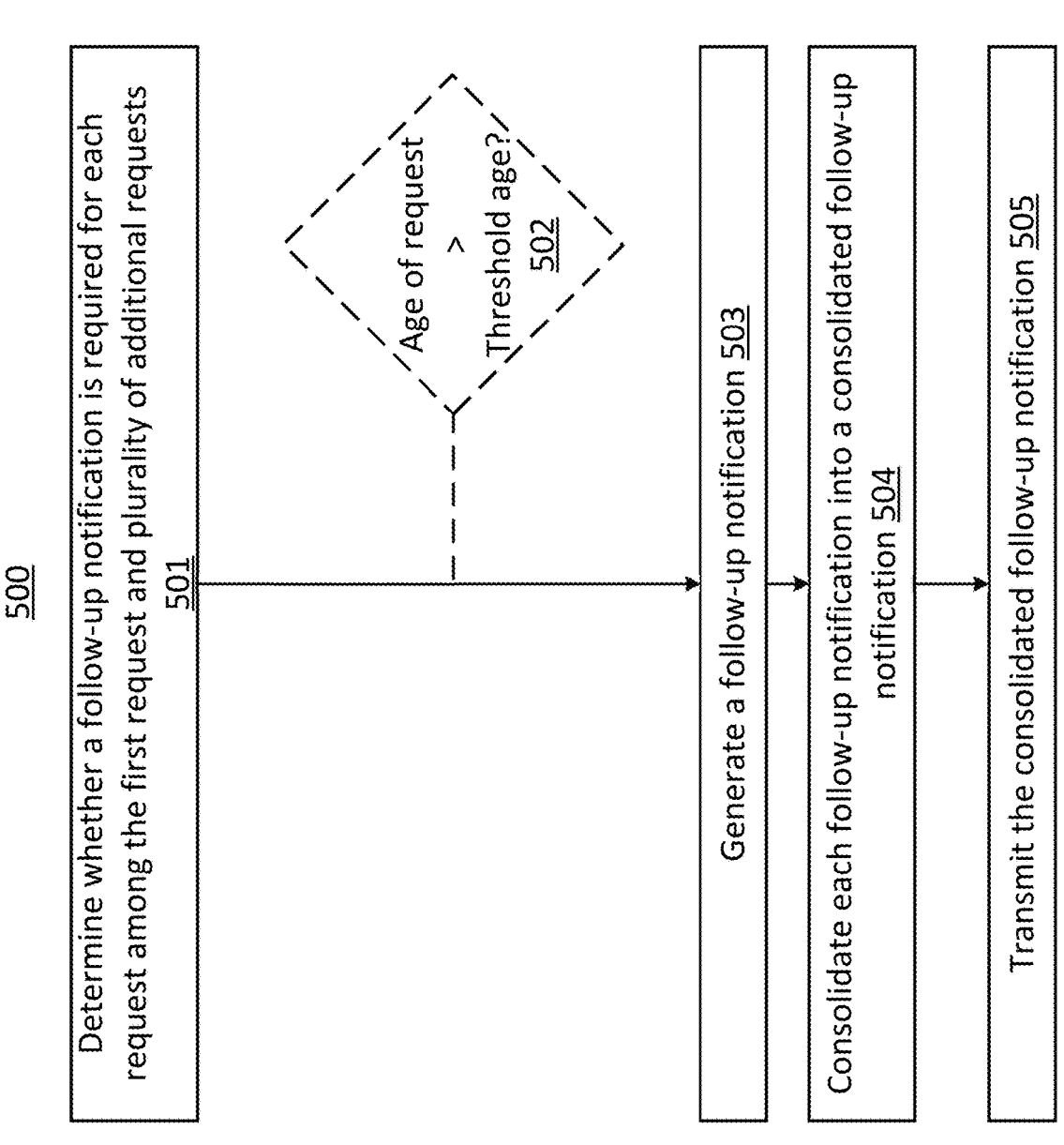
FIG. 5 illustrates a flow chart for a method of generating and transmitting consolidated follow-up notifications according to certain aspects of this disclosure.

FIG. 5 illustrates a flow chart for a method of generating and transmitting consolidated follow-up notifications according to certain aspects of this disclosure. In some examples, the intermediation system 102 is configured to manage a queue 120 containing a plurality of additional requests 122 in addition to the first request 108 and second request 110. As part of managing the queue 120, the intermediation system 102 may generate follow-up notifications, consolidate the follow-up notifications, and transmit the consolidated follow-up notifications.

At step 501, request processing 118 determines whether a follow-up notification is required for each request among the first request and plurality of additional requests. Follow-up notifications may be required per compliance with the sensitivity protocols 142 and communications preference protocols 144 described with respect to methods 400 and 410 respectively. Request configurations may also cause the intermediation system 102 to generate follow-up notifications. Request configurations may include generating a follow-up notification for every request beyond the second generated by a specified requestor. Any time an approval is pending, follow-up notifications may be required and generated, for instance in periodic intervals. Similarly, if a request is pending authentications, follow-up notifications may be required and generated. In another example, follow-up notifications are generated based on the authentications and authorizations of a given initiating requestor 146.

Step 502 illustrates one example method of determining whether a follow-up notification is required per step 501. In step 502, request processing 118 determines the age of each request among the first request 108 and the plurality of additional requests 122. The age may be based on the time and date the request was received by the intermediation system 102. The age of each request is compared against a threshold age. The threshold age indicates whether to generate follow-up notification based on the age of each request. The threshold age may be configurable by a user or administrator such as a designated approver 148 with privileged access to the intermediation system 102. The threshold age may also be based on data associated the request. Thus, in some examples, aging requests that require approval or other action to proceed will result in reminders being sent to designated approver 148 such as an administrator.

At step 503, request processing 118, in response to determining a follow-up notification is required, generates a follow-up notification. In some examples, the follow-up cases can be set to collect compliance related information from designated approver 148 such as case owners and action owners.

At step 504, request processing 118 consolidates each follow-up notification into a consolidated follow-up notification. As the intermediation system 102 may generate multiple follow-up notifications for a given request, and may further process thousands of requests, there may be a need to conserve network bandwidth and reviewer burden due to large volumes of follow-up notification transmission. Therefore, to conserve network bandwidth and computer processing memory, the intermediation system 102 can consolidate follow-up notifications prior to transmission. Follow-up notifications can be consolidated based on targeted recipient. For instance, follow-up cases that have exceeded service level agreement targets may be consolidated and escalated to higher classes of designated approvers 148 for intervention.

At step 505, request processing 118 transmits the consolidated follow-up notification. The consolidated follow-up notification may be transmitted to various designated approvers 148 of a given set of requests. For instance, case owners and action owners may receive consolidated follow-up notifications pertaining to specific requests.

Example Methods for Approving, Authenticating, and Authorizing Requests

FIG. 6 illustrates flow charts for methods of approving requests in addition to authenticating and authorizing modifications made to requests according to certain aspects of this disclosure. Method 600 illustrates an example of a method for requesting approval to process a first request according to certain embodiments. At step 601, request processing 118 determines that approval is required to process the first request 108. The data 114 of the first request 108 may include user profile data indicating that the initiating requestor 146 requires approval for the intermediation system 102 to generate a processed request for transmission. Additionally, or alternatively, the data 114 of the first request 108 may include a task or action that is flagged as requiring approval. Examples of tasks or actions that may require additional approval include retrieving sensitive assets, transmitting messages to unverified users, or sending messages lacking essential information, such as the subject line of an email.

At step 602, request processing 118 transmits an approval request. The approval request may contain the first request 108 and an indication that approval is necessary for the first request 108 to be processed. The approval request may be sent to one or more designated approvers 148 tasked with reviewing a given request such as the first request 108. Request processing 118 may set up the necessary review and approval information so it is available to the designated approver 148. The designated approver 148 may be presented the approval request along with additional requests such as approval requests for the plurality of additional requests 122. Additional information necessary for the designated approver 148 to approve the request may be transmitted displayed to the designated approver 148 for each approval request including data associated with a request configuration.

At step 603, request processing 118 receives approval to process the first request. The designated approver 148 may be provided an interface to review and accept each approval request transmitted by the intermediation system 102. In the event that the designated approver 148 fails to respond or declines the approval, the request may be terminated and logged prior to transmission. At step 604, in response to receiving an approval from the designated approver 148, the intermediation system 102 logs the approval. The approval may be logged in the request log database 128.

Method 610 provides describes methods for determining authorizations associated with an initiating requestor 146 and automatically modifying the request based on the one or more authorizations according to certain aspects of this disclosure. At step 611, request processing 118 identifies an initiating requestor 146. The initiating requestor 146 may be identified by metadata associated with the request (e.g., through user profile data or organization data).

At step 612, request processing 118 authenticates the first request 108 based on the identity of the initiating requestor 146. In some examples, the data 114 of the first request 108 may require the initiating requestor 146 to authenticate interactively for request processing to validate the identity of the initiating requestor 146. For instance, to generate a message 106 including the first request 108, the initiating requestor 146 may be notified via an email prompting the initiating requestor 146 to use the interface 150 to log in and select one or more requests that they have initiated, including the first request 108 s. In other examples, the external resource 104 may generate user profile data for each request generated capable of being processed by the intermediation system 102. The designated approver 148 tasked with approving requests according to certain embodiments, may also be authenticated, e.g. by multi-factor authentication, or by entering a User ID and password, in order to review and approve requests.

At step 613, request processing 118 determines one or more authorizations associated with the initiating requestor 146. Metadata within a request associated with the initiating requestor 146, such as the user profile data may indicate to the intermediation system 102 that the initiating requestor 146 is authorized to request certain actions to be performed, e.g. requesting access to a database of names, but not others, e.g. requesting access to a database of names tied to social security numbers. The intermediation system 102 can retrieve a list of authorizations associated with the identity of each initiating requestor 146 to determine one or more authorizations associated with the initiating requestor 146.

At step 614, request processing 118 automatically modifies the first request 108 based on the one or more authorizations. In one example, if request processing 118 determines the first request exceeds the bounds of the one or more authorizations, request processing 118 may be caused to log the unauthorized request, generate a follow-up case 220 and terminate processing of the first request 108. In other examples request processing 118 strikes or removes actions of the request exceeding the bounds of the one or more authorizations, while maintaining actions identified as within the bounds of each of the one or more authorizations. At step 615, the intermediation system 102 logs the modifications made to the contents of the first request.

Figure 7:
FIG. 7 illustrates a flow chart for a method of validating requests include essential assets prior to transmission according to certain aspects of this disclosure.

Example Method of Maintaining Configurations and Required Data within a Request In some examples, it may be advantageous to maintain the configuration of a request and other essential assets during the processing of a request. FIG. 7 illustrates a flow chart for a method of validating requests include essential assets prior to transmission according to certain aspects of this disclosure. At step 701, the intermediation system 102 identifies an essential asset of the first request. Essential assets may include data within the configuration of a given request such as the user profile, organization, or customer preferences.

At step 702, the intermediation system 102 validates the processed first request includes the essential asset prior to the transmission of the first request. Thus, the intermediation system 102 may perform checks following the processing of a request to ensure that the request contains essential assets. In the same or other examples, subprocesses necessary to maintain the configuration of a request during the processing of the request may also be applied.

At step 703, the intermediation system 102 transmits the processed first request. Transmission of the processed first request, performed after steps 701 and 702, may be applied by the intermediation system 102 to ensure that the configuration of the processed first request is maintained prior to transmission.

Example Computing System for Implementing the Message Dispatch Application

Figure 8:
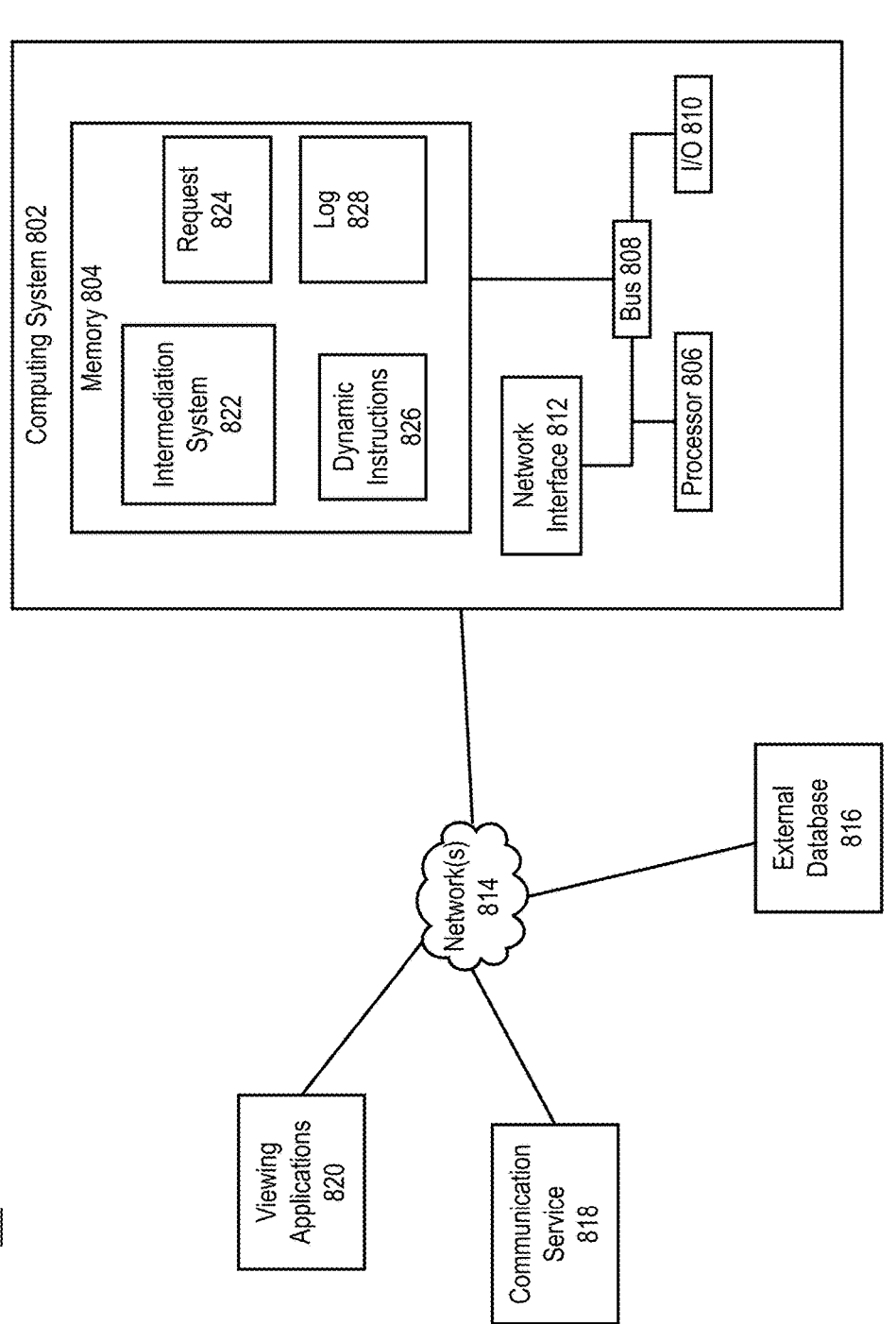
FIG. 8 illustrates a block diagram for an example computing environment capable of executing the described systems and methods.

Any suitable computing system or group of computing systems can be used for performing the operations described herein. For example, FIG. 8 illustrates a block diagram for an example computing environment capable of executing the described systems and methods, according to certain embodiments.

The depicted example of a computing system 802 includes one or more processors 806 communicatively coupled to one or more memory devices 804. The processor 806 executes computer-executable program code or accesses information stored in the memory device 804. Examples of processor 806 include a microprocessor, an application-specific integrated circuit ("ASIC"), a field-programmable gate array ("FPGA"), or other suitable processing device. The processor 806 can include any number of processing devices, including one.

The memory device 804 includes any suitable non-transitory computer readable medium for storing the intermediation system 822, requests 824, dynamic instructions 826, logs 828 and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 802 may also include a number of external or internal devices such as input or output devices. For example, the computing system 802 is shown with an input/output ("I/O") interface 810 that can receive input from input devices or provide output to output devices. A bus 808 can also be included in the computing system 802. The bus 808 can communicatively couple one or more components of the computing system 802.

The computing system 802 executes program code that configures the processor 806 to perform one or more of the operations described above with respect to FIGS. 1-8. The program code includes operations related to, for example, receiving messages from an external resource, processing requests, and logging actions performed to the requests, or other suitable applications or memory structures that perform one or more operations described herein. The program code may be resident in the memory device 804 or any suitable non-transitory computer-readable medium and may be executed by the processor 806 or any other suitable processor. In some embodiments, the program code described above, the intermediation system 822, requests 824, dynamic instructions 826, logs 828, and other received or determined values or data objects are stored in the memory device 804, as depicted in FIG. 8. In additional or alternative embodiments, one or more of the intermediation system 822, requests 824, dynamic instructions 826, logs 828, and other received or determined values or data objects and the program code described above are stored in one or more memory devices accessible via a data network, such as a memory device accessible via a cloud service.

The computing system 802 depicted in FIG. 8 also includes at least one network interface 812. The network interface 812 includes any device or group of devices suitable for establishing a wired or wireless data connection to one or more data networks 814 such as viewing applications 820 including user interfaces, and external database 816. Non-limiting examples of the network interface 812 include an Ethernet network adapter, a modem, and/or the like. A remote communication service 818 is connected to the computing system 802 via network 812 and can perform some of the operations described herein including receiving messages from an external resource, processing requests, and logging actions performed to the requests. The computing system 802 is able to communicate with one or more of the remote communication service 818 and the intermediation system 822 using the network interface 812. Although FIG. 8 depicts the intermediation system 822 as connected to computing system 802 via the networks 812, other embodiments are possible, including the intermediation system 822 running as a program in the memory 804 of computing system 802.

Advantages of Systems and Methods for an Intermediation Service

The described intermediation service provides benefits in automatically controlling the processing of requests input into an organization's computing network. Organization computing networks are flooded with requests originating from external the organization computing environment, where the requests, as generated by external resources may or may not be compliant with regulatory or customer requirements. The described techniques provide means for automatically detecting and rejecting or modifying noncompliant requests. In rejecting noncompliant requests, the intermediation system improves the organization computing network by protecting it from potential risks such as malware. Additionally, in rejecting noncompliant requests, the intermediation system conserves computing resources within the organization computing network. Without the intermediation system, non-compliant requests, particularly when generated at high volumes, may clog the organization computing environment and prevent the transmission of otherwise compliant requests. The described intermediation system may also conserve computing resources of an organization system by consolidating notifications generated for each request.

The intermediation service provides additional advantages in being able to detect non-compliant requests received from requesting users. In response, the intermediation service can provide instructions to the user informing the user of why the request was non-compliant and educate the user to the proper processes and guidelines for submitting a request. In such a way, the intermediation service can train users to submit compliant requests.

General Considerations

Although the subject matter has been described in language specific to structural features or methodological acts, it is to be understood that the subject matter of the appended claims is not necessarily limited to the specific features or acts described above. Rather, the specific features and acts described above are disclosed as examples.

Various operations of examples are provided herein. The order in which one or more or all of the operations are described should not be construed as to imply that these operations are necessarily order dependent. Alternative ordering will be appreciated based on this description. Further, not all operations may necessarily be present in each example provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes," "having", "has," "with," or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, or an ordering. Rather, such terms are merely used as identifiers, names, for features, elements, or items. For example, a first state and a second state generally correspond to state 1 and state 2 or two different or two identical states or the same state. Additionally, "comprising," "comprises," "including," "includes," or the like generally means comprising or including.

Although the disclosure has been shown and described with respect to one or more implementations, equivalent alterations and modifications will occur based on a reading and understanding of this specification and the drawings. The disclosure includes all such modifications and alterations and is limited only by the scope of the following claims.

What is claimed is:

1. A method comprising:

receiving, from an external resource, a message;

filtering the message based on a filtration protocol;

identifying a first request within the message;

managing a queue for the first request among a plurality of additional requests;

identifying a first processing procedure of the first request;

processing the first request per the first processing procedure based on an identified configuration of the first request, the first processing procedure comprising:

retrieving a sensitivity protocol based on the identified configuration of the first request;

identifying a sensitive asset in the first request based on the sensitivity protocol;

attempting to alter the first request to meet sensitivity protocol requirements;

responsive to determining that the first request cannot be altered to meet the sensitivity protocol requirement;

terminating processing of the first request; and logging that the first request was terminated; and responsive to determining that the first request can be altered to meet the sensitivity protocol requirement;

processing the first request; and transmitting the processed first request.

2. The method of claim 1, wherein processing the first processing procedure includes:

retrieving a communication preference protocol based on the identified configuration of the first request;

automatically modifying contents of the first request based on the communication preference protocol to generate the processed first request; and logging the modifications made to the contents of the first request.

3. The method of claim 1 further comprising:

identifying a second request in the message;

managing a queue for the second request among the first request and plurality of additional requests;

identifying a configuration of the second request;

processing the second request per a second processing procedure based on the identified configuration of the second request; and transmitting the second request.

4. The method of claim 1, wherein managing a queue for the first request among a plurality of additional requests comprises:

determining whether a follow-up notification is required for each request among the first request and plurality of additional requests:

for each request determined to require a follow-up notification, generating a follow-up notification;

consolidating each follow-up notification into a consolidated follow-up notification; and transmitting the consolidated follow-up notification.

5. The method of claim 4, wherein determining whether a follow-up notification is required comprises:

for each request among the first request and the plurality of additional requests:

determining an age of the request exceeds a threshold age and that a response to the request is required.

6. The method of claim 1, further comprising, prior to processing the first request and based on the configuration of the first request:

determining approval is required to process the first request;

transmitting an approval request;

receiving approval to process the first request; and logging the approval.

7. The method of claim 1, further comprising, prior to processing the first request and based on the configuration of the first request:

identifying an initiating requestor;

authenticating the first request based on the identity of the initiating requestor;

determining one or more authorizations associated with the initiating requestor;

automatically modifying the first request based on the one or more authorizations; and logging each of one or more modifications made to the first request.

8. The method of claim 1, further comprising, logging each action performed on the first request.

9. The method of claim 1, further comprising identifying, based on the configuration of the first request, an essential asset; and validating the processed first request includes the essential asset prior to transmission of the processed first request.

10. A system comprising:

one or more processors configured to:

receive, from an external resource, a message;

filter the message based on a filtration protocol;

store first contents of the message in a first request;

manage a queue for the first request among a plurality of additional requests;

identify a first processing procedure of the first request;

process the first request per the first processing procedure based on an identified configuration of the first request, the first processing procedure comprising:

retrieving a sensitivity protocol based on the identified configuration of the first request;

identifying a sensitive asset in the first request based on the sensitivity protocol;

attempting to alter the first request to meet sensitivity protocol requirements;

responsive to determining that the first request cannot be altered to meet the sensitivity protocol requirement;

terminating processing of the first request; and logging that the first request was terminated; and responsive to determining that the first request can be altered to meet the sensitivity protocol requirement;

processing the first request; and transmitting the processed first request.

11. The system of claim 10, wherein the one or more processors are further configured to:

retrieve a communication preference protocol based on the identified configuration of the first request; and automatically modify contents of the first request based on the communication preference protocol to generate the processed first request.

12. The system of claim 10, wherein the one or more processors are further configured to:

store second contents of the message in a second request;

manage a queue for the second request among the first request and plurality of additional requests;

identify a configuration of the second request;

process the second request per a second processing procedure based on the identified configuration of the second request; and transmit the second request.

13. The system of claim 10, wherein the one or more processors are further configured to:

determine whether a follow-up notification is required for each request among the first request and plurality of additional requests:

for each request determined to require a follow-up notification, generate a follow-up notification;

consolidate each follow-up notification into a consolidated follow-up notification; and transmit the consolidated follow-up notification.

14. The system of claim 13, wherein the one or more processors are further configured to:

for each request among the first request and the plurality of additional requests:

determining an age of the request exceeds a threshold age and that a response to the request is required.

15. The system of claim 10, wherein the one or more processors are further configured to:

prior to processing the first request and based on the configuration of the first request:

determine approval is required to process the first request;

transmit an approval request;

receive approval to process the first request; and log the approval.

16. The system of claim 10, wherein the one or more processors are further configured to:

prior to processing the first request and based on the configuration of the first request:

identify an initiating requestor;

authenticate the first request based on the identity of the initiating requestor;

determine one or more authorizations associated initiating requestor;

automatically modify the first request based on the one or more authorizations; and log each of one or more modifications made to the first request.

17. The system of claim 10, wherein the one or more processors are further configured to:

log each action performed on the first request.

18. A non-transitory computer readable medium comprising instructions that when executed by one or more processors cause the one or more processors to:

receiving, from an external resource, a message;

filtering the message based on a filtration protocol;

storing first contents of the message in a first request;

managing a queue for the first request among a plurality of additional requests;

identifying a first processing procedure of the first request;

processing the first request per the first processing procedure based on an identified configuration of the first request, the first processing procedure comprising:

retrieving a sensitivity protocol based on the identified configuration of the first request;

identifying a sensitive asset in the first request based on the sensitivity protocol;

attempting to alter the first request to meet sensitivity protocol requirements;

responsive to determining that the first request cannot be altered to meet the sensitivity protocol requirement;

terminating processing of the first request; and logging that the first request was terminated; and responsive to determining that the first request can be altered to meet the sensitivity protocol requirement;

processing the first request; and transmitting the processed first request.

19. A method comprising:

receiving, from an external resource, a message;

filtering the message based on a filtration protocol;

identifying a first request within the message;

managing a queue for the first request among a plurality of additional requests via operations comprising:

determining whether a follow-up notification is required for each request among the first request and plurality of additional requests via determining, for each request among the first request and the plurality of additional requests, an age of the request exceeds a threshold age;

for each request determined to require a follow-up notification, generating a follow-up notification;

consolidating each follow-up notification into a consolidated follow-up notification; and transmitting the consolidated follow-up notification;

identifying a first processing procedure of the first request;

processing the first request per the first processing procedure based on an identified configuration of the first request; and transmitting the processed first request.

20. A method comprising:

receiving, from an external resource, a message;

filtering the message based on a filtration protocol;

identifying a first request within the message;

managing a queue for the first request among a plurality of additional requests;

identifying a first processing procedure of the first request and a configuration of the first request;

based on the configuration of the first request:

identifying an initiating requestor;

authenticating the first request based on the identity of the initiating requestor;

determining one or more authorizations associated with the initiating requestor;

automatically modifying the first request based on the one or more authorizations; and logging each of one or more modifications made to the first request;

subsequently processing the first request per the first processing procedure based on an identified configuration of the first request; and transmitting the processed first request.

* * * * *